(12) United States Patent
Hamasaka

(10) Patent No.: US 7,801,411 B2
(45) Date of Patent: Sep. 21, 2010

(54) MOVING PICTURE DATA PLAYBACK APPARATUS, MOVING PICTURE DATA PLAYBACK METHOD, MOVING PICTURE DATA RECORDING APPARATUS, MOVING PICTURE DATA RECORDING METHOD, AND RECORDING MEDIUM WITH MOVING PICTURE DATA RECORDED THEREON

(75) Inventor: Hiroshi Hamasaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1289 days.

(21) Appl. No.: 11/196,270

(22) Filed: Aug. 4, 2005

(65) Prior Publication Data

US 2006/0029365 A1 Feb. 9, 2006

(30) Foreign Application Priority Data

Aug. 6, 2004 (JP) ............................ 2004-230617

(51) Int. Cl.
*H04N 5/91* (2006.01)
(52) U.S. Cl. .............................. 386/68; 386/69; 386/83; 386/96; 386/125
(58) Field of Classification Search ............. 386/45–46, 386/68, 125, 126
See application file for complete search history.

(56) References Cited

U.S. PATENT DOCUMENTS

| | | | | |
|---|---|---|---|---|
| 5,687,275 A | * | 11/1997 | Lane et al. | ...................... 386/68 |
| 2007/0110390 A1 | * | 5/2007 | Toma | ........................... 386/68 |
| 2008/0056686 A1 | * | 3/2008 | Oshima et al. | ............... 386/126 |

FOREIGN PATENT DOCUMENTS

| | | |
|---|---|---|
| JP | 04-318375 | 11/1992 |
| JP | 06-339113 | 12/1994 |
| JP | 08-130713 | 5/1996 |

(Continued)

OTHER PUBLICATIONS

Japanese Notice of Reasons for Rejection, w/ English translation thereof, issued in Japanese Patent Application No. JP 2004-230617 dated Dec. 8, 2009.

*Primary Examiner*—Jamie J Atala
(74) *Attorney, Agent, or Firm*—McDermott Will & Emery LLP

(57) ABSTRACT

In order to provide: a moving picture data playback apparatus and a moving picture data playback method, in which smooth high-speed playback is performed even when the moving picture playback speed is changed stepwise, and, in addition, the number of frames skipped is reduced in the high-speed playback; a moving picture data recording apparatus and a moving picture data recording method for recording the moving picture data played back by the moving picture data playback apparatus; and a recording medium having the moving picture data recorded thereon, the moving picture data recorded on the recording medium contains not only moving picture data for normal playback but also moving picture data for high-speed playback, which has a reduced number of pixels as compared with the moving picture data for normal playback. A picture forming circuit synthesizes intraframe-coded regions in a plurality of frames contained in the read moving picture data for high-speed playback. As a result, the number of frames processed per unit time doubles, thereby achieving high-speed playback which is twice as fast as the normal playback.

2 Claims, 11 Drawing Sheets

FOREIGN PATENT DOCUMENTS

| | | |
|---|---|---|
| JP | 2762765 | 3/1998 |
| JP | 3056653 | 4/2000 |
| JP | 2002-354380 A | 12/2002 |
| JP | 2003-087731 A | 3/2003 |
| JP | 2004-056582 | 2/2004 |

* cited by examiner

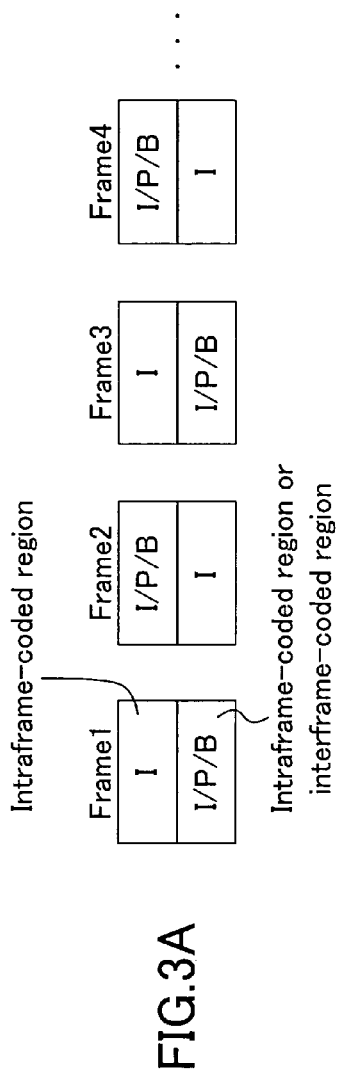
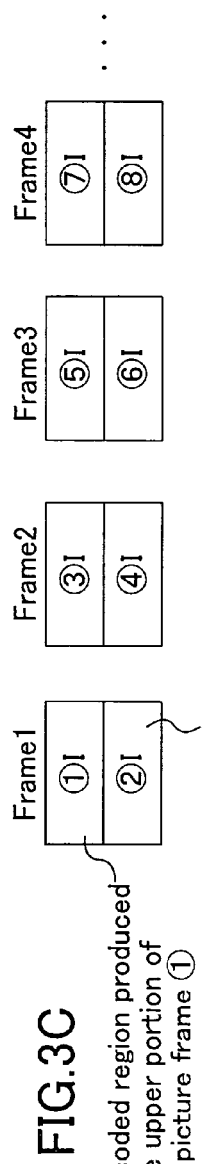
FIG.3A
FIG.3B
FIG.3C

Synthesized picture in the case of quadruple speed playback

Synthesized picture in the case of octuple speed playback

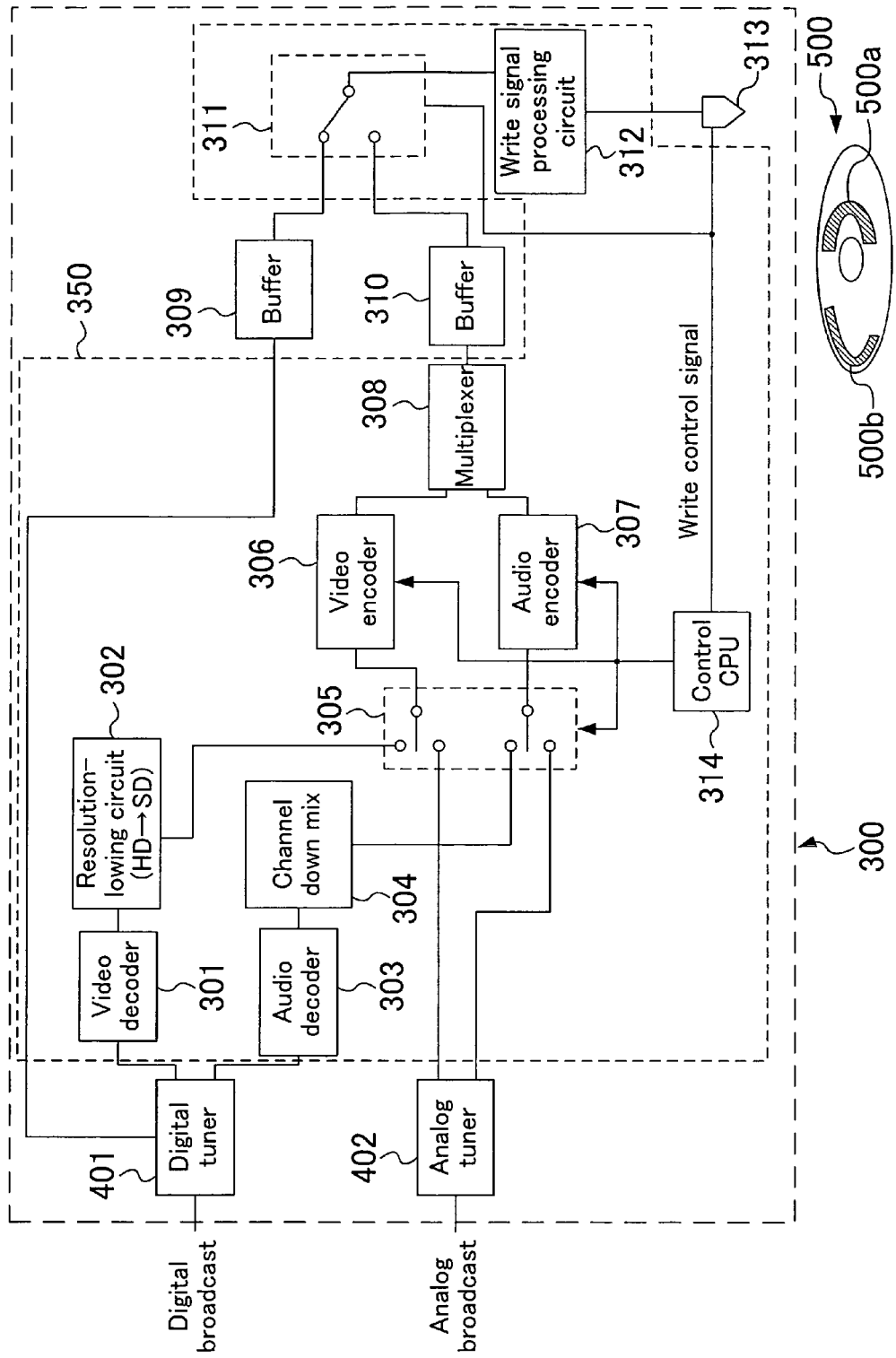

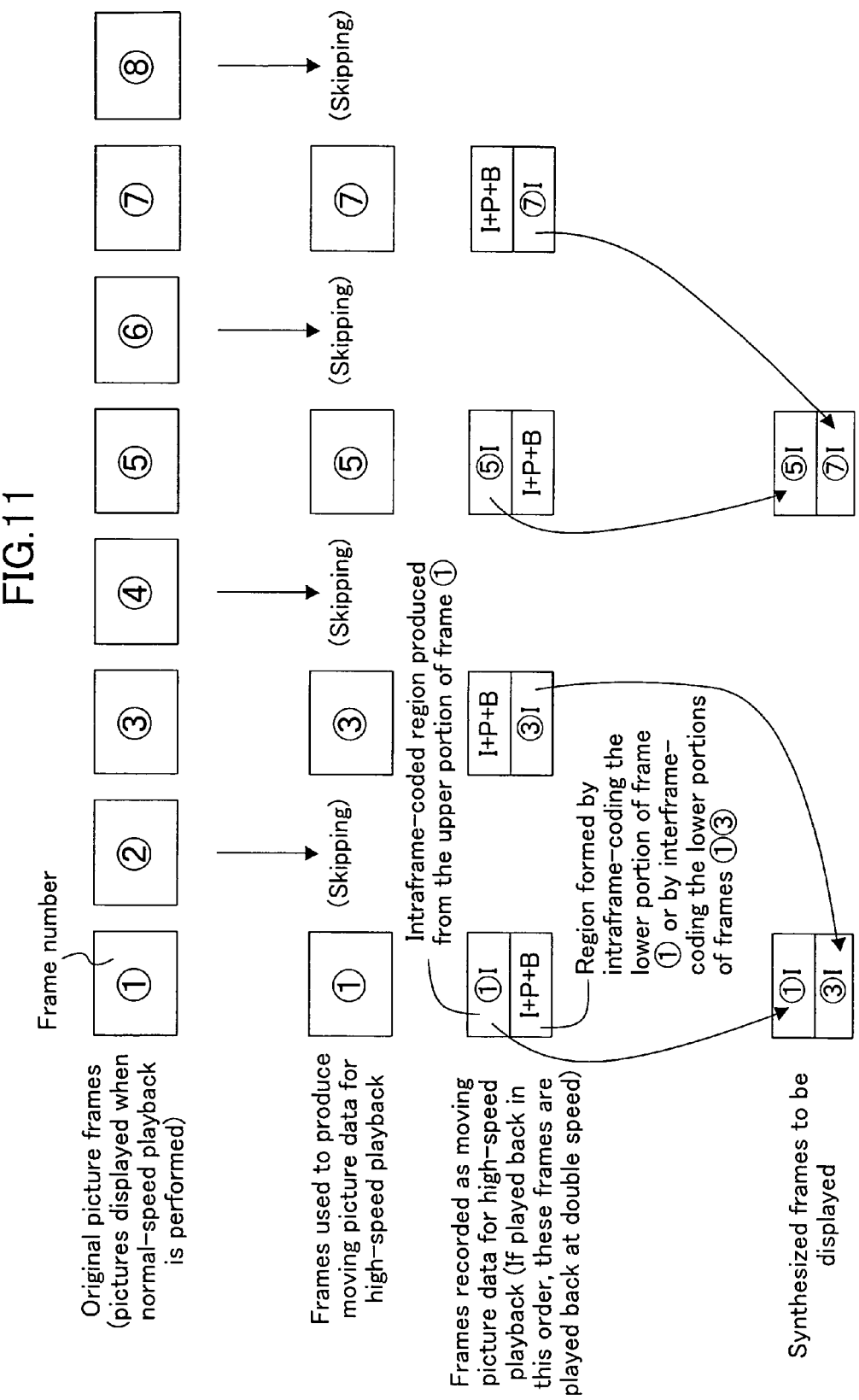

MOVING PICTURE DATA PLAYBACK APPARATUS, MOVING PICTURE DATA PLAYBACK METHOD, MOVING PICTURE DATA RECORDING APPARATUS, MOVING PICTURE DATA RECORDING METHOD, AND RECORDING MEDIUM WITH MOVING PICTURE DATA RECORDED THEREON

CROSS-REFERENCE TO RELATED APPLICATIONS

This application claims priority under 35 U.S.C. §119 on Patent Application No. 2004-230617 filed in Japan on Aug. 6, 2004, the entire contents of which are incorporated herein by reference.

BACKGROUND OF THE INVENTION

1. Field of the Invention

The present invention relates to: a moving picture data playback apparatus and a moving picture data playback method, in which special playback, such as high-speed playback, of moving pictures is carried out; a moving picture data recording apparatus and a moving picture data recording method for recording the moving picture data played back by the moving picture data playback apparatus; and a recording medium having the moving picture data recorded thereon.

2. Description of the Related Art

In a moving picture data playback apparatus for playing back moving pictures, fast-forward/fast-reverse playback (high-speed playback) of pictures is carried out to retrieve desired scenes.

A conventional moving picture data playback apparatus selectively reads and plays back only intraframe-coded frame pictures (i.e., intra pictures) in moving picture data recorded on a recording medium such as an optical disk, so as to achieve high-speed playback of the moving pictures (see Japanese Laid-Open Publication No. 2762765, for example).

Another conventional playback apparatus generates, in advance, moving picture data for high-speed playback, which has a smaller number of pixels than moving picture data for normal-speed playback, and then records the moving picture data for high-speed playback on a recording medium. By reading and playing back the recorded data, the playback apparatus achieves high-speed playback (see Japanese Laid-Open Publication No. 6-339113, for example).

In helical scan VTRs, the tracks on a tape are accessed across the tracks at a speed higher than a normal playback speed, and slices in which all of the blocks contained are intra-frame coded are decoded one by one. The decoded slices are superimposed on the already displayed picture, whereby high-speed playback is performed (see Japanese Laid-Open Publication No. 3056653, for example)

However, in the configuration in which intra pictures are selectively read from an optical disk to achieve high-speed playback of the moving pictures, the access speed to the optical disk is not sufficiently high, depending upon the playback speed. As a result, all of the intra pictures cannot be read in time for the display. Therefore, when the intra pictures are read, some of them have to be skipped, which leads to a problem in that the high-speed playback cannot be performed smoothly and some of the short scenes cannot be retrieved.

In the configuration in which moving picture data for high-speed playback is generated and recorded in advance, if the generated moving picture data for high-speed playback is played back as it is, no problem will occur. However, in a case in which the playback speed is changed and the moving picture data for high-speed playback is played back at a higher speed, the moving picture data for high-speed playback has to be read with some part thereof being skipped, which leads to the problem that smooth high-speed playback cannot be performed, as in the example in which the intra pictures are selectively read from the optical disk for the high-speed playback of the moving pictures.

Also, in the case of a recording medium, such as an optical disk, that has a spiral or concentric track structure, it is difficult to read the data on the recording medium across the track or the tracks. It is thus difficult to apply the example of high-speed playback achieved in the VTR to a moving picture data playback apparatus for playing back a recording medium having a track structure.

SUMMARY OF THE INVENTION

The present invention was made in view of the above problems, and it is therefore an object of the present invention to provide: a moving picture data playback apparatus and a moving picture data playback method, in which smooth high-speed playback is performed even when the playback speed is changed stepwise, and, in addition, the number of frames skipped is reduced in the high-speed playback; a moving picture data recording apparatus and a moving picture data recording method for recording the moving picture data played back by the moving picture data playback apparatus; and a recording medium having the moving picture data recorded thereon.

In order to achieve the above object, in a principal aspect of the present invention, a moving picture data playback apparatus for reading moving picture data recorded on a randomly accessible recording medium and playing back moving pictures includes: normal-playback reading means for reading, from the recording medium, moving picture data for normal playback encoded so as to be played back at normal playback speed; high-speed-playback reading means for reading, from the recording medium, moving picture data for high-speed playback that is capable of being played back at a speed higher than the normal playback speed and contains a plurality of pictures, each of which contains at least an intraframe-coded region; control means for controlling the normal-playback reading means and the high-speed-playback reading means so that either the moving picture data for normal playback or the moving picture data for high-speed playback is selected and read; and high-speed-playback-picture playback means for playing back a synthesized picture, in which the intraframe-coded regions of a plurality of the pictures have been combined based on the moving picture data for high-speed playback read by the high-speed-playback reading means.

In the inventive apparatus thus configured, a plurality of pictures in the moving picture data for high-speed playback that has been read at high speed are combined into a single picture, thereby achieving high-speed playback. In addition, it is possible to display at least part of each picture, that is, it is possible to reduce the number of frames to be skipped.

In another aspect of the present invention, the control means performs the control in accordance with moving picture playback speed; and the high-speed-playback-picture playback means plays back a synthesized picture, in which the intraframe-coded regions of a number of pictures that corresponds to the playback speed have been combined.

Then, it is possible to change the playback speed stepwise.

In another aspect of the present invention, the intraframe-coded region in each of the pictures is one of a plurality of regions in a display picture, which are obtained by horizontally dividing the display picture.

In another aspect of the present invention, when the moving picture data for high-speed playback is played back n times faster than the moving picture data for normal playback, the height of each of the intraframe-coded regions is greater than or equal to 1/n-th of the height of the entire display picture.

Then, high-speed playback can be performed at a designated multiplying factor.

In another aspect of the present invention, each of the moving picture data for normal playback and the moving picture data for high-speed playback is a picture data stream that contains a plurality of macroblocks, each of which contains a plurality of pixels; and each of the intraframe-coded regions contains a plurality of the macroblocks.

In another aspect of the present invention, the apparatus further includes: picture-data extracting means for extracting picture data contained in all of the macroblocks, from the first one through the last one, existing in the intraframe-coded region in each of the pictures; and a buffer for storing the extracted picture data in a storage area therein that is associated with the intraframe-coded region the picture data of which has been extracted, wherein the storage, by the buffer, of the picture data of the intraframe-coded region in each picture allows playback of the synthesized picture, in which the intraframe-coded regions of a plurality of the pictures have been combined.

In another aspect of the present invention, the apparatus further includes first-macroblock detecting means for detecting the first macroblock in the intraframe-coded region in each picture, wherein the picture data extracting means starts the picture-data extraction in accordance with detection by the first-macroblock detecting means.

In another aspect of the present invention, the first-macroblock detecting means detects control data that indicates the beginning of picture data contained in a given unit area, in which the first macroblock in one of the intraframe-coded regions is contained.

Then, the picture data in each picture used in the synthesization process can be extracted.

In another aspect of the present invention, the high-speed-playback-picture playback means plays back at least one of moving picture data for high-speed playback, in which the number of pixels contained has been reduced, moving picture data for high-speed playback, in which the number of pictures contained has been reduced, and moving picture data for high-speed playback, in which high-frequency components have been removed.

Then, it is possible to reduce the amount of moving picture data for high-speed playback, allowing the moving picture data for high-speed playback and the like to be read at high speed.

In another aspect of the present invention, the high-speed-playback reading means and the normal-playback reading means read the moving picture data for high-speed playback and the moving picture data for normal playback, respectively, from different regions in a common recording medium.

In another aspect of the present invention, the high-speed-playback reading means and the normal-playback reading means read the moving picture data for high-speed playback and the moving picture data for normal playback, respectively, from different recording media.

In another aspect of the present invention, the randomly accessible recording medium has a concentric or spiral track structure.

Then, it is possible to adjust the access timing to the moving picture data for normal playback and the accessing timing to the data for high-speed playback, thereby enabling the data for high-speed playback to be read at high speed.

In a principal aspect of the present invention, a moving picture data playback apparatus for reading moving picture data recorded on a randomly accessible recording medium, and playing back moving pictures includes: first reading means for reading given moving picture data from the recording medium; second reading means for reading, from the recording medium, moving picture data of another type that is different from the given moving picture data; and control means for controlling the first reading means and the second reading means so that either the given moving picture data or the moving picture data of another type is selected and read, and when a first state of playback for first moving picture data which is one of the given moving picture data and the moving picture data of another type is changed to a second state of playback for second moving picture data which is the other of the given moving picture data and the moving picture data of another type, obtaining an address of a region in the recording medium from which reading of the second moving picture data is started after the changeover from the first state of playback to the second state of playback, based on first and second information, and controlling the first read means or the second read means so that the reading of the second moving picture data is started from the region located in that address, the first information being information in which time stamps that correspond to times indicated on respective pictures displayed according to the first moving picture data are associated with addresses of regions in the recording medium, in which the first moving picture data is stored with the addresses corresponding to the pictures, the second information being information in which time stamps that correspond to times indicated on respective pictures displayed according to the second moving picture data are associated with addresses of regions in the recording medium, in which the second moving picture data is stored with the addresses corresponding to the pictures.

In another aspect of the present invention, the first read means reads, from the recording medium, moving picture data for normal playback encoded so as to be played back at normal playback speed; the second read means reads, from the recording medium, moving picture data for high-speed playback that is capable of being played back at a speed higher than the normal playback speed and contains a plurality of pictures, each of which contains at least an intraframe-coded region; and the apparatus further includes high-speed-playback-picture playback means for playing back a synthesized picture, in which the intraframe-coded regions of a plurality of the pictures have been combined based on the moving picture data for high-speed playback read by the second reading means.

Then, playbacks of two different types of moving-picture data sets, for example, playback of moving picture data for normal playback and playback of data for high-speed playback, can be switched using the time stamps.

In a principal aspect of the present invention, a moving picture data recording apparatus for recording moving picture data on a randomly accessible recording medium includes: normal-playback moving-picture-data generating means for generating moving picture data for normal playback encoded so as to be played back at normal playback speed; high-speed-playback moving-picture-data generating means for generating moving picture data for high-speed playback that is capable of being played back at a speed higher than the normal playback speed and contains a plurality of pictures, each of which contains at least an intraframe-coded region; and recording means for recording the moving picture data for normal playback and the moving picture data for high-speed playback on the recording medium.

Then, in addition to the moving picture data for normal playback, the data for high-speed playback is generated.

In another aspect of the present invention, the intraframe-coded region in each of the pictures is one of a plurality of regions in a display picture, which are obtained by horizontally dividing the display picture.

In another aspect of the present invention, when the moving picture data for high-speed playback is played back n times faster than the moving picture data for normal playback, the height of each of the intraframe-coded regions is greater than or equal to 1/n-th of the height of the entire display picture.

Then, moving picture data for high-speed playback that can be played back at a designated multiplying factor.

In another aspect of the present invention, each of the moving picture data for normal playback and the moving picture data for high-speed playback is a picture data stream that contains a plurality of macroblocks, each of which contains a plurality of pixels; and each of the intraframe-coded regions contains a plurality of the macroblocks.

Then, data for high-speed playback, from which regions to be used in synthesization process can be extracted easily, is generated.

In another aspect of the present invention, the apparatus further includes: picture-data extracting means for extracting picture data contained in all of the macroblocks, from the first one through the last one, existing in the intraframe-coded region in each of the pictures; and a buffer for storing the extracted picture data in a storage area therein that is associated with the intraframe-coded region the picture data of which has been extracted, wherein the storage, by the buffer, of the picture data of the intraframe-coded region in each picture allows recording of a synthesized picture, in which the intraframe-coded regions of a plurality of the pictures have been combined.

In another aspect of the present invention, the high-speed-playback moving-picture-data generating means generates interframe-coded moving picture data for high-speed playback, for a region in each picture, which is different from the intraframe-coded region.

In another aspect of the present invention, the high-speed-playback moving-picture-data generating means generates moving picture data for high-speed playback, in which a given picture has been encoded, for a region in each picture, which is different from the intraframe-coded region.

In another aspect of the present invention, the high-speed-playback moving-picture-data generating means generates at least one of moving picture data for high-speed playback, in which the number of pixels contained has been reduced, moving picture data for high-speed playback, in which the number of pictures contained has been reduced, and moving picture data for high-speed playback, in which high-frequency components have been removed.

Then, it is possible to reduce the amount of data for high-speed playback.

In a principal aspect of the present invention, a moving picture data recording apparatus for recording moving picture data on a randomly accessible recording medium includes: first moving picture data generating means for generating given moving picture data; second moving picture data generating means for generating moving picture data of another type that is different from the given moving picture data; and recording means for recording the given moving picture data and the moving picture data of another type on the recording medium, and when first moving picture data, which is one of the given moving picture data and the moving picture data of another type, and second moving picture data, which is the other of the given moving picture data and the moving picture data of another type, are recorded, recording first and second information on the recording medium, the first information being information in which time stamps that correspond to times indicated on respective pictures displayed according to the first moving picture data are associated with addresses of regions in the recording medium, in which the first moving picture data is stored with the addresses corresponding to the pictures, the second information being information in which time stamps that correspond to times indicated on respective pictures displayed according to the second moving picture data are associated with addresses of regions in the recording medium, in which the second moving picture data is stored with the addresses corresponding to the pictures.

In another aspect of the present invention, the first moving picture data generating means generates moving picture data for normal playback encoded so as to be played back at normal playback speed, and the second moving picture data generating means generates moving picture data for high-speed playback that is capable of being played back at a speed higher than the normal playback speed and contains a plurality of pictures, each of which contains at least an intraframe-coded region.

Then, it is possible to generate two different types of moving-picture data sets, for example, moving picture data for normal playback and data for high-speed playback, playbacks of which can be switched using the time stamps.

In a principal aspect of the present invention, in a randomly accessible recording medium having moving picture data recorded thereon, the moving picture data contains a plurality of pictures, each of which contains at least an intraframe-coded region.

In another aspect of the present invention, in each picture, given encoded picture-data is recorded in a region other than the intraframe-coded region.

In another aspect of the present invention, intraframe-coded picture data on synthesized pictures, in each of which different portions in a plurality of the pictures have been combined, is recorded.

Then, high-speed playback is achieved by combining a plurality of pictures contained in the moving picture data recorded on the recording medium into a single picture.

In a principal aspect of the present invention, a moving picture data playback method for reading moving picture data recorded on a randomly accessible recording medium, and playing back moving pictures includes: a normal-playback reading step of reading, from the recording medium, moving picture data for normal playback encoded so as to be played back at normal playback speed; a high-speed-playback reading step of reading, from the recording medium, moving picture data for high-speed playback that is capable of being played back at a speed higher than the normal playback speed and contains a plurality of pictures, each of which contains at least an intraframe-coded region; a control step of controlling the normal-playback reading step and the high-speed-playback reading step so that either the moving picture data for normal playback or the moving picture data for high-speed playback is selected and read; and a high-speed-playback-picture playback step of playing back a synthesized picture, in which the intraframe-coded regions of a plurality of the pictures have been combined based on the moving picture data for high-speed playback read in the high-speed-playback reading step.

Then, a plurality of pictures in the moving picture data for high-speed playback that has been read at high speed are combined into a single picture, thereby achieving high-speed playback. In addition, it is possible to display at least part of each picture, that is, it is possible to reduce the number of frames to be skipped.

In another aspect of the present invention, in the control step, the control is performed in accordance with moving picture playback speed; and in the high-speed-playback-picture playback step, a synthesized picture, in which the intraframe-coded regions of a number of pictures that corresponds to the playback speed have been combined, is played back.

Then, the playback speed can be changed stepwise.

In a principal aspect of the present invention, a moving picture data playback method for reading moving picture data recorded on a randomly accessible recording medium, and playing back moving pictures includes: a first reading step of reading given moving picture data from the recording medium; a second reading step of reading, from the recording medium, moving picture data of another type that is different from the given moving picture data; and a control step of controlling the first reading step and the second reading step so that either the given moving picture data or the moving picture data of another type is selected and read, and when a first state of playback for first moving picture data which is one of the given moving picture data and the moving picture data of another type is changed to a second state of playback for second moving picture data which is the other of the given moving picture data and the moving picture data of another type, obtaining an address of a region in the recording medium from which reading of the second moving picture data is started after the changeover from the first state of playback to the second state of playback, based on first and second information, and controlling the first read step or the second read step so that the reading of the second moving picture data is started from the region located in that address, the first information being information in which time stamps that correspond to times indicated on respective pictures displayed according to the first moving picture data are associated with addresses of regions in the recording medium, in which the first moving picture data is stored with the addresses corresponding to the pictures, the second information being information in which time stamps that correspond to times indicated on respective pictures displayed according to the second moving picture data are associated with addresses of regions in the recording medium, in which the second moving picture data is stored with the addresses corresponding to the pictures.

Then, playbacks of two different types of moving-picture data sets, for example, playback of moving picture data for normal playback and playback of data for high-speed playback, can be switched using the time stamps.

In a principal aspect of the present invention, a moving picture data recording method for recording moving picture data on a randomly accessible recording medium includes: a normal-playback moving-picture-data generating step of generating moving picture data for normal playback encoded so as to be played back at normal playback speed; a high-speed-playback moving-picture-data generating step of generating moving picture data for high-speed playback that is capable of being played back at a speed higher than the normal playback speed and contains a plurality of pictures, each of which contains at least an intraframe-coded region; and a recording step of recording the moving picture data for normal playback and the moving picture data for high-speed playback on the recording medium.

Then, in addition to the moving picture data for normal playback, the data for high-speed playback is generated.

In a principal aspect of the present invention, a moving picture data recording method for recording moving picture data on a randomly accessible recording medium includes: a first moving picture data generating step of generating given moving picture data; a second moving picture data generating step of generating moving picture data of another type that is different from the given moving picture data; and a recording step of recording the given moving picture data and the moving picture data of another type on the recording medium, and when first moving picture data, which is one of the given moving picture data and the moving picture data of another type, and second moving picture data, which is the other of the given moving picture data and the moving picture data of another type, are recorded, recording first and second information on the recording medium, the first information being information in which time stamps that correspond to times indicated on respective pictures displayed according to the first moving picture data are associated with addresses of regions in the recording medium, in which the first moving picture data is stored with the addresses corresponding to the pictures, the second information being information in which time stamps that correspond to times indicated on respective pictures displayed according to the second moving picture data are associated with addresses of regions in the recording medium, in which the second moving picture data is stored with the addresses corresponding to the pictures.

Then, it is possible to generate two different types of moving-picture data sets, for example, moving picture data for normal playback and data for high-speed playback, playbacks of which can be switched using the time stamps.

In a principal aspect of the present invention, a moving picture data playback apparatus for reading moving picture data for high-speed playback recorded on a randomly accessible recording medium and playing back moving pictures, the apparatus includes: a control CPU for controlling playback operation for the moving picture data for high-speed playback; a slice detecting circuit for detecting a slice start position from the moving picture data for high-speed playback; a buffer memory for holding the moving picture data for high-speed playback; a switch for switching between transfer and non-transfer of the moving picture data for high-speed playback to the buffer memory in accordance with the slice start position detected by the slice detecting circuit and an instruction from the CPU; and a video decoder for decoding to output the moving picture data for high-speed playback held in the buffer memory.

In the inventive apparatus thus configured, a plurality of pictures in the moving picture data for high-speed playback are combined into a single picture, thereby achieving high-speed playback.

In a still another aspect of the present invention, a moving picture data recording apparatus for recording moving picture data for normal playback and moving picture data for high-speed playback which are recorded on a randomly accessible recording medium, the apparatus includes: a picture resolution lowering circuit for lowering resolution of moving picture data; and a video encoder for compressing the moving picture data of which resolution is lowered by the picture resolution lowering circuit to generate the moving picture data for high-speed playback, wherein a part of each picture in the moving picture data for high-speed playback is intraframe-coded.

Then, in addition to the moving picture data for normal playback, the moving picture data for high-speed playback is generated.

BRIEF DESCRIPTION OF THE DRAWINGS

FIG. 3A is a view illustrating an exemplary configuration of moving picture data for high-speed playback according to the present invention.

FIG. 3B is a view illustrating an exemplary configuration of moving picture data for high-speed playback according to the present invention.

FIG. 3C is a view illustrating an exemplary configuration of moving picture data for high-speed playback according to the present invention.

FIG. 9 is a block diagram indicating the structure of a moving picture data recording apparatus according to the present invention, and a recording medium on which moving picture data is recorded by the moving picture data recording apparatus.

FIG. 10B is a view illustrating moving picture data synthesized on a FIFO buffer 602a.

FIG. 11 is a view illustrating the configuration of moving picture data for high-speed playback which contains a reduced number of frames.

DETAILED DESCRIPTION OF THE INVENTION

Hereinafter, preferred embodiments of the present invention will be described with reference to the accompanying drawings.

<Moving Picture Data Playback Apparatus>

(Configuration of Moving Picture Data Playback Apparatus and Configuration of Moving Picture Data)

Figure 1:
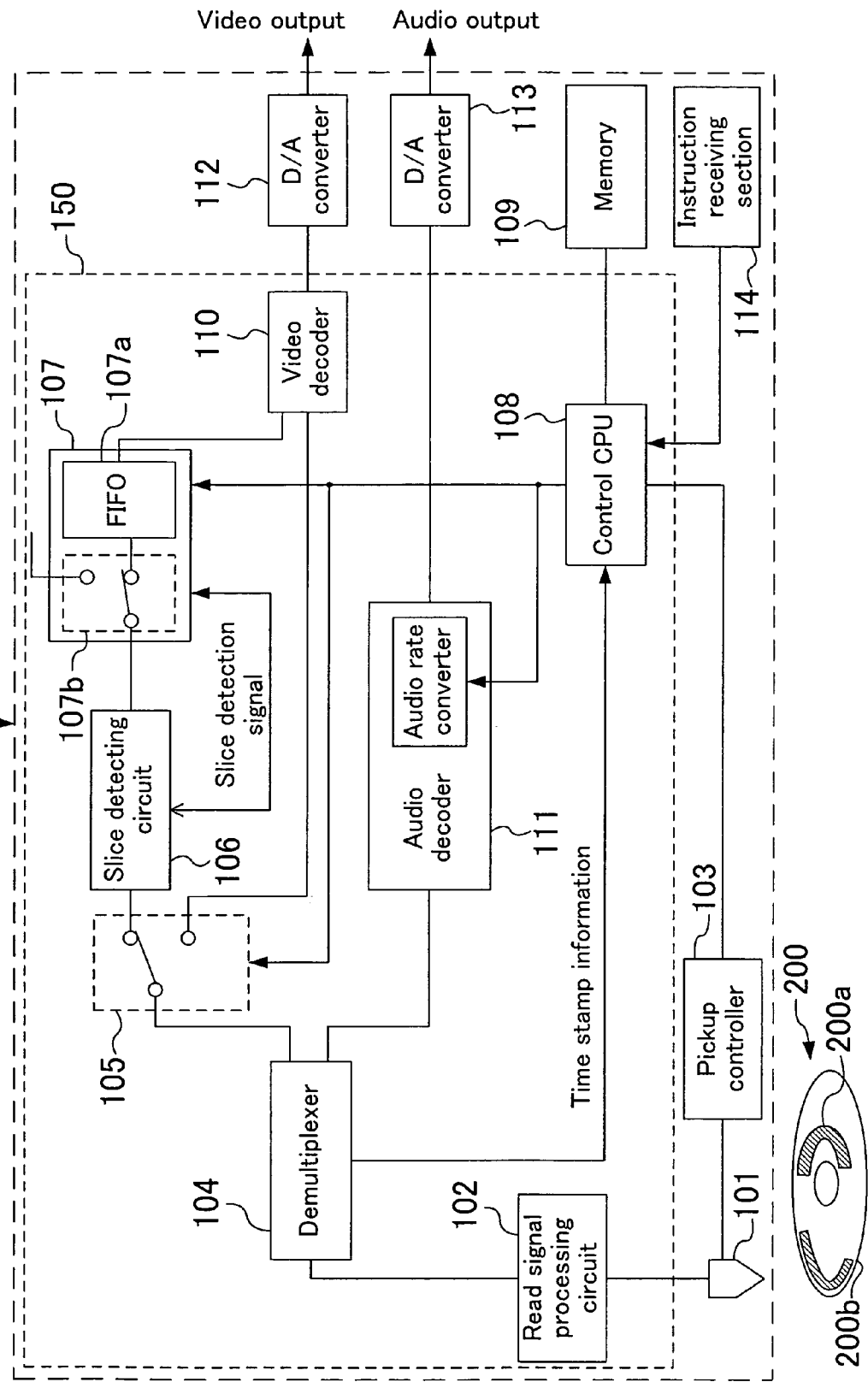
FIG. 1 is a block diagram illustrating the configuration of a moving picture data playback apparatus according to the present invention, and a recording medium on which moving picture data played back by the moving picture data playback apparatus has been recorded.

FIG. 1 is a block diagram illustrating the configuration of a moving picture data playback apparatus 100 according to the present invention, and a recording medium 200 on which moving picture data played back by the moving picture data playback apparatus 100 has been recorded.

The moving picture data playback apparatus 100 includes a pickup 101, a read signal processing circuit 102, a pickup controller 103, a demultiplexer 104, a selector 105, a slice detecting circuit 106, a picture forming circuit 107, a control CPU 108, a memory 109, a video decoder 110, an audio decoder 111, a D/A converter 112, a D/A converter 113, and an instruction receiving section 114. The moving picture data playback apparatus 100 is capable of reading moving picture data for normal playback 200a, encoded in compliance with, e.g., the MPEG2 (moving picture expert group 2) coding algorithm and recorded on the recording medium 200, and then playing back the moving pictures at normal playback speed. The moving picture data playback apparatus 100 is also capable of reading moving picture data for high-speed playback 200b and playing back the read data at high speed.

The pickup 101 irradiates the recording medium 200 with a laser beam, for example, and detects the reflected light, thereby reading data recorded on the recording medium 200.

The read signal processing circuit 102 performs signal processing, such as correction of errors, on the read data.

The pickup controller 103 moves the pickup 101 according to a read control signal, which is input from the control CPU 108 and indicates a data-read range, thereby controlling the pickup 101 so that the pickup 101 reads data from a given address in the recording medium 200.

The data read by the pickup 101, in which moving picture data and audio data have been multiplexed, is divided by the demultiplexer 104 into the moving picture data and the audio data. The demultiplexer 104 then outputs the moving picture data and the audio data to the selector 105 and the audio decoder 111, respectively, while outputting, to the control CPU 108, time stamps put on the respective frames contained in the read moving picture data.

According to a speed-specifying signal, which is input from the control CPU 108 and indicates a playback speed, the selector 105 switches so that the moving picture data demultiplexed by the demultiplexer 104 is input to either the slice detecting circuit 106 or the video decoder 110.

The slice detecting circuit 106 outputs the received moving picture data as it is to the picture forming circuit 107, while detecting, from the received moving picture data, a slice start code that indicates the beginning of a slice. Upon detection of a slice start code, the slice detecting circuit 106 outputs, to the picture forming circuit 107, a slice detection signal that indicates the beginning of a slice in the moving picture data.

Figure 2:
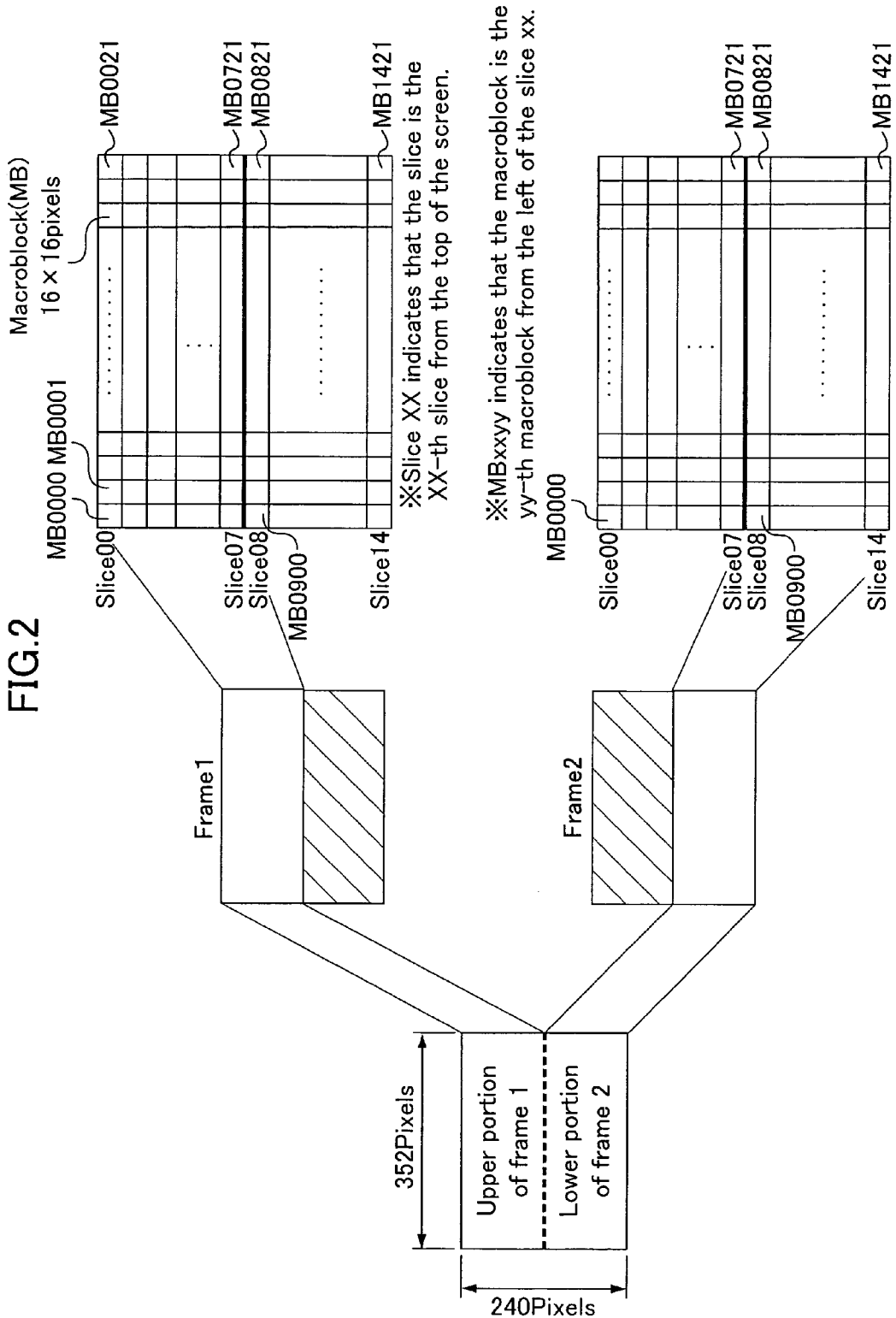
FIG. 2 is a view illustrating picture synthesization carried out when high-speed playback at double speed is performed.

The picture forming circuit 107 includes a FIFO buffer 107a and a switch 107b therein. According to the slice detection signal and the speed-specifying signal input from the control CPU 108, the picture forming circuit 107 extracts part of the moving picture data in an intraframe-coded region in each frame and outputs the extracted data via the FIFO buffer 107a, thereby synthesizing the intraframe-coded regions of a plurality frames. For example, as shown in FIG. 2, Slice 00 through Slice 07 in the first frame (frame 1) and Slice 08 through Slice 14 in the second frame (frame 2) are read in sequence at a high speed and synthesized to form a single frame.

The control CPU 108 outputs the read control signal to the pickup 101, thereby controlling the pickup 101 in such a manner that data is read from the given address in the recording medium 200, while the control CPU 108 outputs the speed-specifying signal in accordance with a given control signal for changing the playback speed, which is input from the instruction receiving section 114, thereby controlling the selector 105, the picture forming circuit 107, and the audio decoder 111 so that normal-speed playback or high-speed playback is performed.

In the memory 109, time maps 200c and 200d, which will be described later, are stored.

The video decoder 110 decodes the moving picture data synthesized by the picture forming circuit 107, converts the decoded data into picture signals, such as a luminance signal (digital signal), required for the display of pictures, and outputs these picture signals.

The audio decoder 111 outputs the audio data demultiplexed by the demultiplexer 104, as an audio signal (digital signal) that is to be played back at the speed corresponding to the speed-specifying signal.

The D/A converter 112 converts the output signal of the video decoder 110 into an analog video signal and outputs the analog video signal.

The D/A converter 113 converts the output signal of the audio decoder 111 into an analog audio signal and outputs the analog audio signal.

The instruction receiving section 114 receives an instruction, such as a playback instruction or a playback speed change instruction, from a device external to the moving picture data playback apparatus 100, e.g., a remote controller, and outputs a given control signal for changing the playback speed to the control CPU 108.

The function blocks in this embodiment, specifically, the read signal processing circuit 102, the demultiplexer 104, the selector 105, the slice detecting circuit 106, the picture forming circuit 107, the control CPU 108, the video decoder 110, the audio decoder 111, are typically realized as an LSI, i.e., an integrated circuit (for example, an LSI 150 shown in FIG. 1). Each of these function blocks may be individually integrated on a single chip, or some or all of them may be integrated together on a single chip.

(Configuration of the Recording Medium 200, and the Contents of Data Recorded on the Recording Medium 200)

The recording medium 200 is formed using a randomly accessible recording medium, such as a DVD (digital versatile disc), for example. On the recording medium 200, the moving picture data for normal playback 200a and the moving picture data for high-speed playback 200b are recorded in different regions so as to be read continuously, and the time maps 200c and 200d are also recorded.

The moving picture data for high-speed playback 200b is encoded moving picture data whose pixels have been reduced in the encoding process so that the frames thereof have a smaller number of pixels than the frames of the moving picture data for normal playback 200a (for example, when the frames of the moving picture data for normal playback 200a have 704×480 pixels, the frames of the moving picture data for high-speed playback 200b have 352×240 pixels). Therefore, the moving picture data for high-speed playback 200b can be read at a higher speed than the moving picture data for normal playback 200a. For instance, in the case of the moving picture data for high-speed playback 200b, a large number of pictures can be read per unit time without greatly increasing the number of revolutions of the recording medium.

Also, as shown in FIG. 3A, the frames of the moving picture data for high-speed playback 200b are each formed in such a manner that either the upper portion or the lower portion thereof (a portion thereof having a height greater than or equal to one-half of the height of the entire frame) alternately becomes a region which is intraframe-coded (which will be hereinafter-referred to as an intraframe-coded region) and that the region other than the intraframe-coded region is interframe predictive-coded or intraframe-coded. The intraframe-coded regions are used in the synthesis process performed by the picture forming circuit 107.

Figure 4:
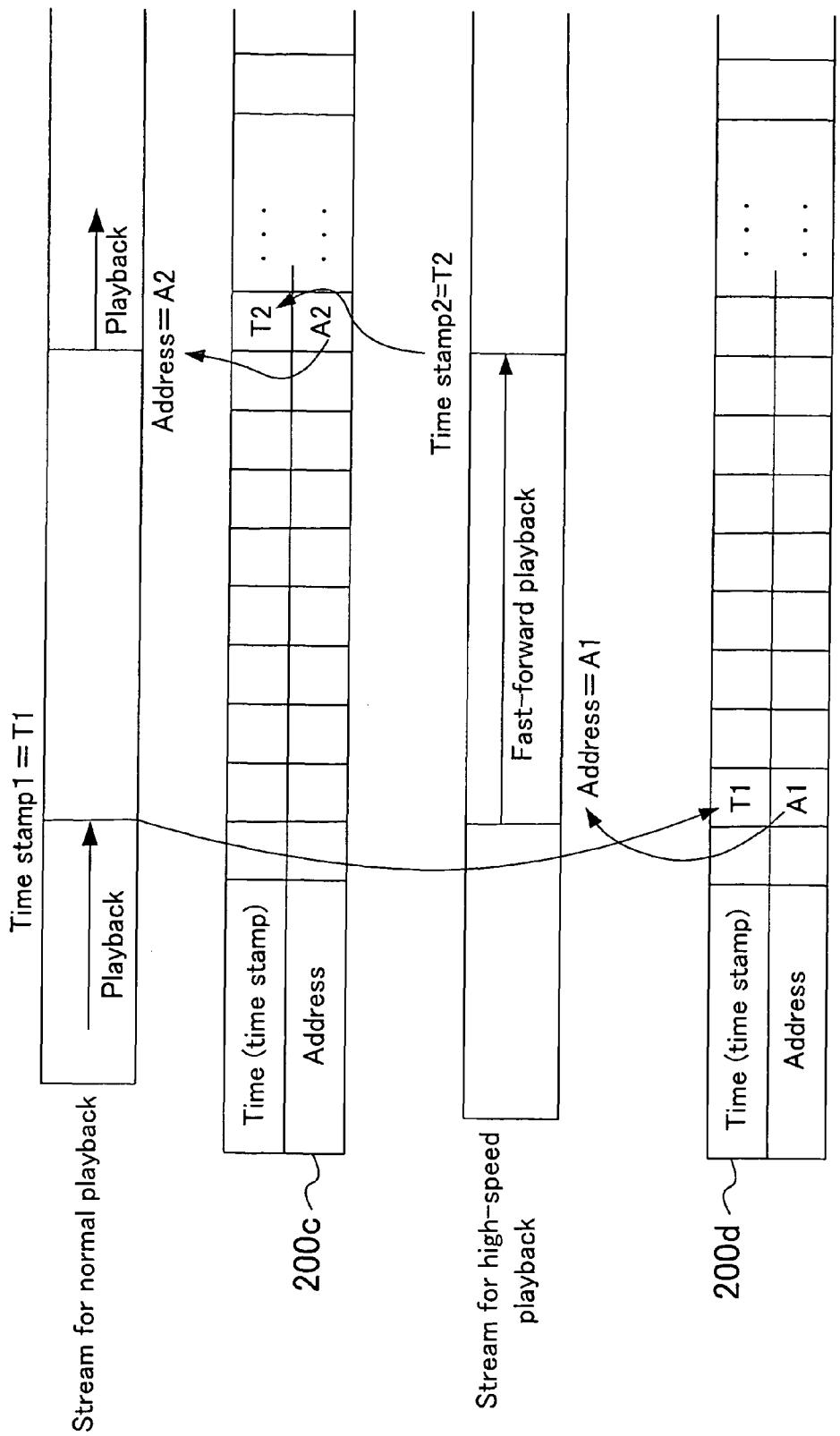
FIG. 4 is a view illustrating the configurations of time maps and indicating how to obtain a read address when playback speed is changed.

For example, as shown in FIG. 4, in the time map 200c, time stamps which correspond to the times indicated on the respective frames displayed according to the moving picture data for normal playback 200a are associated with storage addresses of the moving picture data for normal playback 200a on the recording medium 200. In the time map 200d, time stamps in the moving picture data for high-speed playback 200b are associated with storage addresses of the moving picture data for high-speed playback 200b on the recording medium 200.

The time stamps of the moving picture data for normal playback 200a and the time stamps of the moving picture data for high-speed playback 200b can be converted into each other. Since each time stamp of the moving picture data for normal playback 200a uniquely corresponds to one of the time stamps of the moving picture data for high-speed playback 200b, and vice versa, the address can be found using the time stamp after the conversion. The calculation of a corresponding time stamp is typically performed based on a time stamp of the moving picture data for high-speed playback 200b with respect to the moving picture data for normal playback 200a, the offset, or the increase ratio. If a calculated, corresponding time stamp for the moving picture data for high-speed playback 200b or the moving picture data for normal playback 200a is not present in the time map of the moving picture data 200b or 200a, a time stamp in that time map that is closest to the calculated time stamp may be used as the corresponding time stamp.

In this embodiment, for the sake of simplicity, it is assumed that the moving picture data for normal playback 200a and the moving picture data for high-speed playback 200 have the same stamps for the corresponding pictures.

(Operation of the Moving Picture Data Playback Apparatus)

Figure 5:
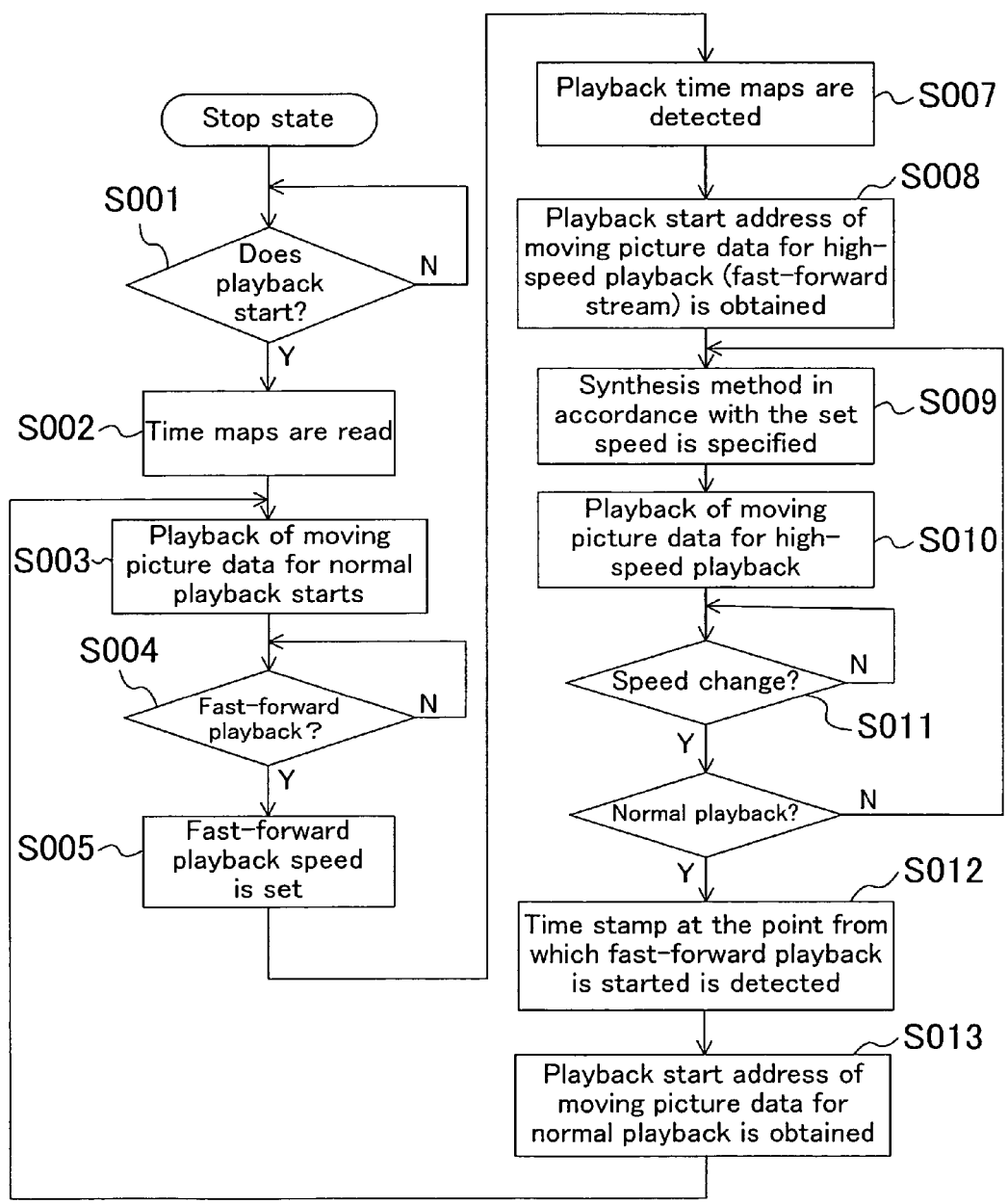
FIG. 5 is a flowchart indicating operations performed by the moving picture data playback apparatus of the present invention, when normal-speed playback and high-speed playback are carried out in accordance with external operations.

FIG. 5 is a flowchart indicating operations carried out by the moving picture data playback apparatus of this embodiment, when the moving picture data playback apparatus performs normal-speed playback and high-speed playback in accordance with external operations.

When activated, the moving picture data playback apparatus 100 repeatedly makes a determination as to whether or not a playback instruction has been given (S001). When normal-speed playback of moving pictures is started, the control CPU 108 outputs a read control signal to the pickup controller 103 so that the time maps 200c and 200d are read. The read time maps 200c and 200d are stored in the memory 109 (S002).

Next, the control CPU 108 outputs a speed-specifying signal that indicates normal playback speed, to the selector 105 and the audio decoder 111 (S003). In response to this, the selector 105 switches so that the moving picture data output from the demultiplexer 104 is input to the video decoder 110 (S003).

In addition, the control CPU 108 outputs a read control signal to the pickup controller 103 so that the moving picture data for normal playback 200a and the audio data are read. In accordance with the read control signal, the pickup controller 103 controls the pickup 101 so that the moving picture data for normal playback 200a and the audio data are read from the recording medium 200. The read data is divided into the moving picture data and the audio data by the demultiplexer 104. The video decoder 110 decodes the divided moving picture data for normal playback 200a and then converts the decoded data into picture signals, such as a luminance signal (digital signal), required for the display of pictures. The D/A converter 112 then outputs the analog pictures. The audio data is converted, by the audio decoder 111, into a digital signal, which indicates the level of sound pressure, and then the D/A converter 113 outputs the analog sound. By these steps, the frames are sequentially played back at the normal speed (for example, each picture is displayed for 1/30 of a second) as shown in the upper portion of FIG. 6.

During the normal-speed playback, a determination as to whether or not the playback speed has been changed to high speed is repeatedly made (S004).

When the playback speed has been changed from the normal speed to high speed, e.g., double speed, the control CPU 108 changes the position of the selector 105, so that moving picture data output from the demultiplexer 104 is input to the slice detecting circuit 106, while the control CPU 108 also outputs a speed-specifying signal that indicates double-speed playback, to the picture forming circuit 107 and the audio decoder 111 (S005).

Next, the control CPU 108 obtains a playback start address of the data to be played back at high speed, which corresponds to the picture currently being played back at the normal speed, by using a time stamp (i.e., a time stamp that corresponds to the frame picture currently being displayed) input from the demultiplexer 104 and the time map 200*d* stored in the memory 109. More specifically, as shown in FIG. 4, the address of the moving picture data for high-speed playback 200*b* that corresponds to the time stamp is obtained (S007 to S008).

The control CPU 108 then outputs a read control signal based on that address to the pickup controller 103. The pickup controller 103 controls the pickup 101 so that the moving picture data for high-speed playback 200*b* is read. The read moving picture data for high-speed playback 200*b* is input to the slice detecting circuit 106 via the demultiplexer 104 and the selector 105.

The slice detecting circuit 106 outputs the read moving picture data for high-speed playback 200*b* as it is to the picture forming circuit 107, while outputting a slice detection signal to the picture forming circuit 107 each time a slice start code is detected.

A slice layer formed in compliance with the MPEG2 contains information that indicates, for each slice, whether or not all of the macroblocks contained in the slice are intraframe-coded. Each slice start code contains information that indicates the vertical position of the slice.

Figure 7:
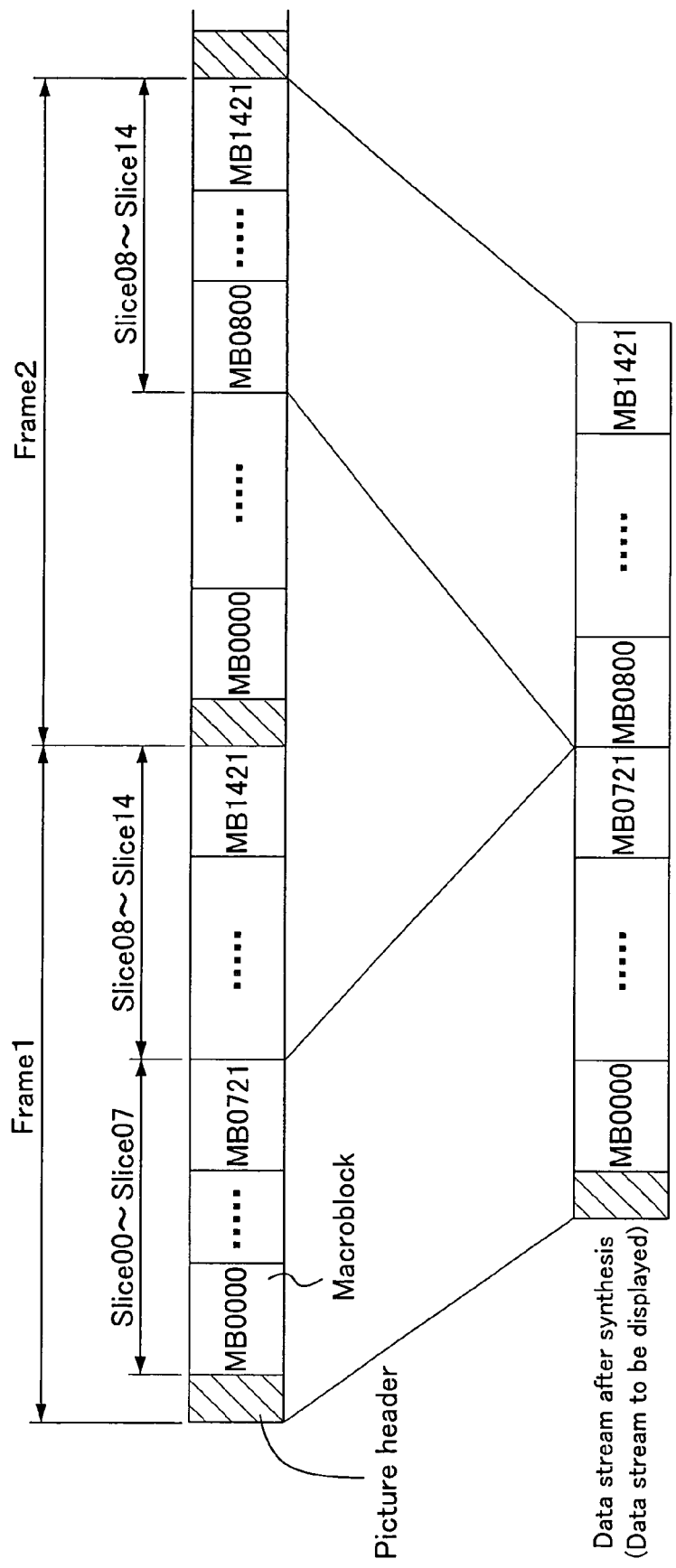
FIG. 7 is a view illustrating moving picture data synthesized by a picture forming circuit.

Upon receipt of the slice detection signal, the picture forming circuit 107 uses the information sets to determine whether or not the upper portion of the frame is an intraframe-coded region. More specifically, when the slice is Slice 00 and all of the macroblocks contained in the slice are intraframe-coded, it is determined that the upper portion of the frame is an intraframe-coded region. In this case, eight consecutive slices (Slice 00 to Slice 07) including that slice are stored in the FIFO buffer 107*a* in the picture forming circuit 107, while the position of the switch 107*b* is changed so that reading of the moving picture data contained in Slice 08 through Slice 14 is skipped and that nothing is performed for these slices. Moving picture data in the frame that is read immediately after the frame whose upper portion is an intraframe-coded region is moving picture data whose lower portion is an intraframe-coded region. When the moving picture data in this frame whose lower portion is an intraframe-coded region is read, the picture forming circuit 107 stores Slice 08 through Slices 14 in the FIFO buffer 107*b*, while the position of the switch 107*b* is changed so that reading of the moving picture data contained in Slice 00 through Slice 07 is skipped and nothing is performed for these slices (S009 to S010). As a result of these operations, as shown in FIG. 7, the moving picture data stored in the FIFO buffer 107*a* becomes synthesized moving picture data, in which the moving picture data in the frame 1 is in the upper portion (Slice 00 to Slice 07) and the moving picture data in the frame 2 is in the lower portion (Slice 08 to Slice 14).

The synthesized moving picture data is converted by the video decoder 110 into picture signals, such as a luminance signal (digital signal), required for the display of pictures, and the D/A converter 112 then outputs the analog pictures (S009 to S010).

Also, the read audio data is converted by the audio decoder 111 so as to be played back at double speed, and the D/A converter 113 then produces the analog audio output (S009 to S010).

Figure 6:
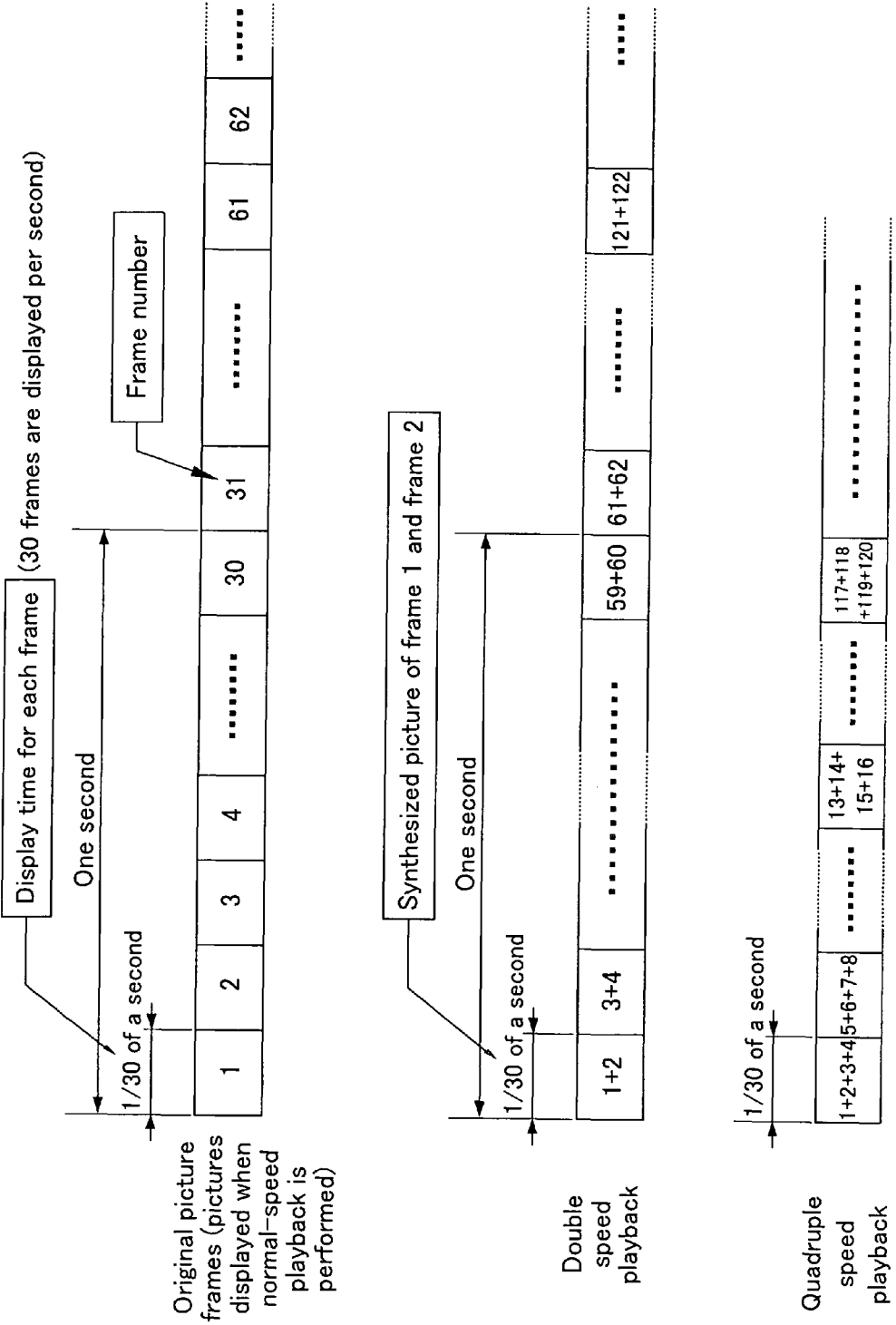
FIG. 6 is a view illustrating pictures displayed when normal-speed playback, double-speed playback, and quadruple-speed playback are performed.

By the operations described above (S005 to S010), the frames, in each of which the pictures of two frames have been combined, are displayed sequentially as shown in the middle portion of FIG. 6. That is, the number of frames processed per unit time doubles, allowing high-speed playback that is twice as fast as the normal speed.

During the high-speed playback, a determination as to whether or not the playback speed has been changed to the normal speed is repeatedly made (S011). When the playback speed has been changed from the high speed to the normal speed, the control CPU 108 obtains an address of the moving picture data for normal playback 200*a* on the recording medium 200 that corresponds to the frame picture currently being displayed, by using a time stamp input from the demultiplexer 104 and the time map 200*c* stored in the memory 109 (S012 to S013). Then, the steps S003 to S013 are repeated to perform the operations such as the normal-speed playback mentioned above.

In order to perform fast-reverse playback, the speed of fast-reverse playback is determined and a playback start address is obtained (S005 to S008). Then, the moving picture data for high-speed playback 200*b* is intermittently read in certain units in the reverse direction into a track buffer (not shown), and the steps S009 to S010 described above are performed, whereby the fast-reverse playback can be performed. A detailed description of the fast-reverse playback is, however, omitted herein for the sake of simplicity of the description.

As described above, in the moving picture data playback apparatus, the number of frames processed per unit time is twice, as compared with the normal-speed playback, thereby allowing the number of frames displayed per unit time to be doubled (i.e., allowing high-speed playback at double speed.) In addition, since at least part of each frame is displayed (i.e., the number of frames to be skipped is reduced), it is possible to retrieve even short scenes.

(High-Speed Playback at Quadruple Speed and Octuple Speed)

Figure 8A:
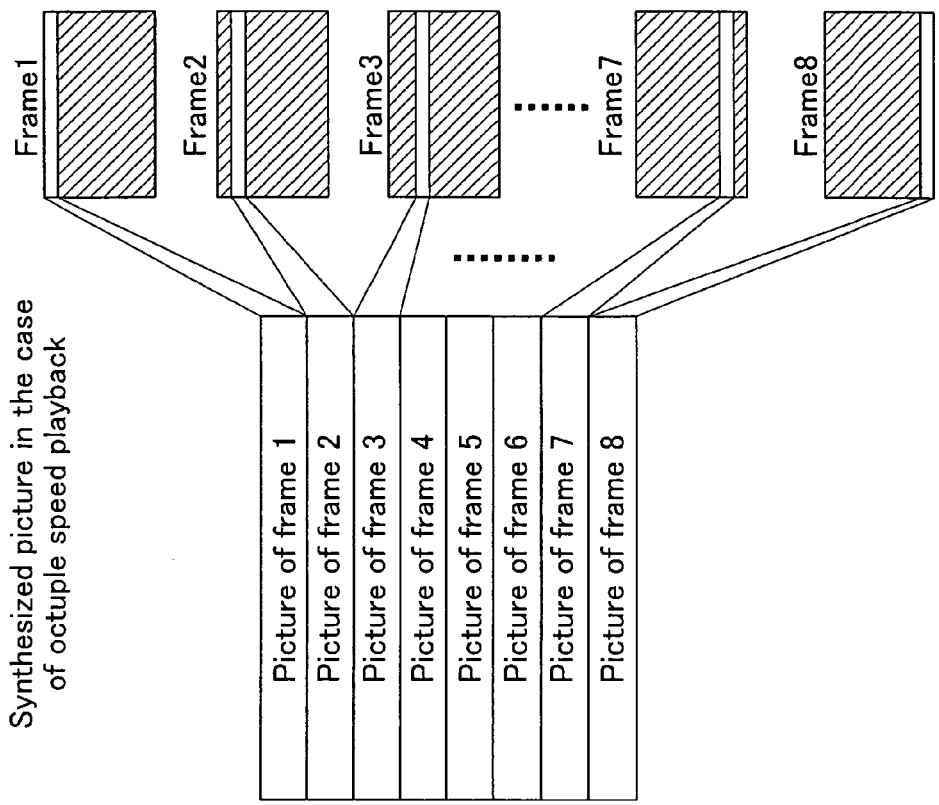
FIG. 8A is a view indicating how to combine pictures when high-speed playback at quadruple speed is performed.
Figure 8B:
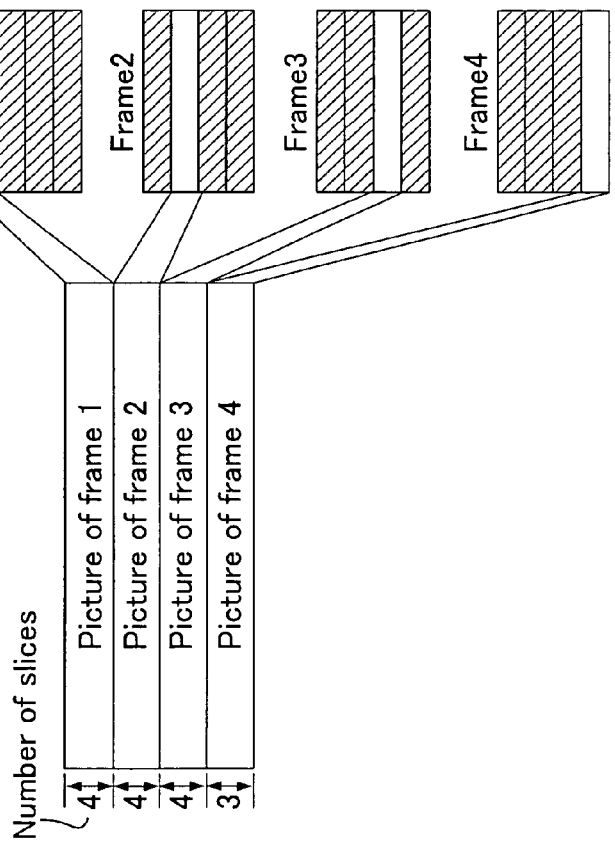
FIG. 8B is a view indicating how to combine pictures when high-speed playback at octuple speed is performed.

Instead of combining two frames into a single frame as described above, four frames may be synthesized into a single frame, as shown in FIG. 8A. In this case, as shown in the lower portion of FIG. 6, the number of frames processed per unit time is four times greater than that in the normal-speed playback, allowing high-speed playback performed at quadruple speed. Alternatively, as shown in FIG. 8B, if eight frames are combined into a single frame, eight-fold high-speed playback is achieved.

In this manner, according to the present invention, the playback speed can be changed stepwise.

It should be noted that the moving picture data playback apparatus 100 may be configured so that no audio is output during high-speed playback, whereby the configuration of the moving picture data playback apparatus 100 can be simplified.

Although in the embodiment described above, each intraframe-coded region is detected using a slice start code, the detection of intraframe-coded region can be performed in a different manner. For example, information that indicates which portion of the picture is an intraframe-coded region, and information that indicates which portion of the picture is used in quadruple-speed and octuple-speed playback, may be recorded in advance in a user data region in each picture in the moving picture data, and the recorded information may be detected at the time of playback. Alternatively, the head of an intraframe-coded region may be detected using information buried in the macroblock layer, which indicates the addresses of the macroblocks and the encoding modes.

<Moving Picture Data Recording Apparatus>

(Configuration of Moving Picture Data Recording Apparatus)

FIG. 9 is a block diagram indicating the structure of a moving picture data recording apparatus 300 according to the present invention, which includes a digital broadcasting tuner 401 and an analog broadcasting tuner 402 so that digital broadcasts and analog broadcasts can be recorded, and also indicating a recording medium 500 on which moving picture data is recorded by the moving picture data recording apparatus 300.

As shown in FIG. 9, the moving picture data recording apparatus 300 includes a video decoder 301, a resolution-lowering circuit 302, an audio decoder 303, a channel down mix 304, a selector 305, a video encoder 306, an audio encoder 307, a multiplexer 308, a buffer 309, a buffer 310, a selector 311, a write signal processing circuit 312, a write head 313, and a control CPU 314. The moving picture data recording apparatus 300 is capable of recording broadcasts received by the digital broadcasting tuner 401 and the analog broadcasting tuner 402, as moving picture data for normal playback 500a that can be played back at normal speed, and also as moving picture data for high-speed playback 500b used in high-speed playback.

The video decoder 301 decodes picture data of a digital broadcast received by the digital broadcasting tuner 401 and outputs the decoded picture data.

The resolution-lowering circuit 302 performs resolution-lowering operation. For instance, the resolution-lowering circuit 302 converts, e.g., high-definition picture data with a HD resolution of 1920×1088 pixels to, e.g., standard-definition picture data with a SD resolution of 704×480 pixels.

The audio decoder 303 decodes audio data of the digital broadcast received by the digital broadcasting tuner 401 and outputs the decoded audio data.

The channel down mix 304 reduces the number of channels of the audio data, thereby decreasing the amount of audio data.

The selector 305 selects either a picture signal input from the resolution-lowering circuit 302 or a picture signal input from the analog broadcasting tuner 402, as the input to the video encoder 306.

The video encoder 306 encodes the picture signal input from the analog broadcasting tuner 402 in compliance with a given algorithm (MGEG2, for example), while the video encoder 306 generates moving picture data for high-speed playback 500b from the video signal input from the resolution-lowering circuit 302.

The audio encoder 307 encodes the audio signal input by way of the selector 305, in accordance with a given algorithm.

The multiplexer 308 multiplexes the output data of the video encoder 306 and the output data of the audio encoder 307 and outputs the resultant data.

The buffer 309 stores therein the output data of the digital broadcasting tuner 401.

The buffer 310 stores therein the output data of the multiplexer 308.

The selector 311 selects which of the data sets, the data stored in the buffer 309 or the data stored in the buffer 310, is input to the write signal processing circuit 312.

The write signal processing circuit 312 performs signal processing, such as addition of an error correction code, on the data input via the selector 311.

The write head 313 writes given data on the recording medium 500 according to a write control signal that is input from the control CPU 314 and indicates a range into which the data is to be written.

By outputting the write control signal to the write head 313, the control CPU 314 controls the write head 313 so that the data is written on a given address in the recording medium 500. The control CPU 314 also outputs, to the selector 305, the video encoder 306, and the audio encoder 307, a mode selecting signal witch indicates a mode for recording of moving picture data for normal-speed playback or a mode for recording of moving picture data for high-speed playback, whereby the control CPU 314 controls the selector 305, the video encoder 306, the audio encoder 307, and the selector 311 so that moving picture data for normal playback 500a or moving picture data for high-speed playback 500b is generated.

The recording medium 500 is formed using a randomly accessible recording medium such as a hard disk, for example. On the recording medium 500, the moving picture data for normal playback 500a and the moving picture data for high-speed playback 500b are recorded in different regions so as to be assessed continuously, and the time maps are also recorded on the recording medium 500.

The function blocks in this embodiment, specifically, the video decoder 301, the resolution-lowering circuit 302, the audio decoder 303, the channel down mix 304, the selector 305, the video encoder 306, the audio encoder 307, the multiplexer 308, the selector 311, and the write signal processing circuit 312, are typically realized as an LSI, i.e., an integrated circuit (for example, an LSI 350 shown in FIG. 9). Each of these function blocks may be individually integrated on a single chip, or some or all of them may be integrated together on a single chip.

(Operation of the Moving Picture Data Recording Apparatus)

(Operation Performed when Moving Picture Data of a Received Broadcast is Recorded as Moving Picture Data for Normal Playback)

First, when moving pictures received by the digital broadcasting tuner 401 are recorded as they are, the control CPU 314 switches the selector 311 to the buffer 309 position, and then controls the write head 313, whereby the received moving pictures are sequentially recorded, through the buffer 309, on given addresses in the recording medium 500, in which the moving picture data for normal playback 500a is to be recorded.

In a case in which the pictures received by the digital broadcasting tuner 401 are subjected to a resolution-lowering process (for example, the resolution of the pictures is lowered from the HD standard to the SD standard) before they are recorded, the control CPU 314 first outputs, to the selector 305, the video encoder 306, and the audio encoder 307, a mode selecting signal that indicates a mode for recording of picture data for normal-speed playback. In response to this, the selector 305 switches so that the output signal of the resolution-lowering circuit 302 is input to the video encoder 306 and that the output signal of the channel down mix 304 is input to the audio encoder 307.

The picture data received by the digital broadcasting tuner 401 is decoded by the video decoder 301, and then the resolution of the decoded data is lowered by the resolution-lowering circuit 302. The picture data with the lowered resolution is encoded by the video encoder 306 in compliance with a give algorithm (MPEG2, for example). On the other hand, the audio data is decoded by the audio decoder 303, and then the amount of the decoded data is reduced to a predetermined level by the channel down mix 304 and the resultant audio data is then input to the audio encoder 307 via the selector 305. The audio encoder 307 encodes the input audio data in accordance with a given algorithm.

The encoded picture data and audio data are multiplexed by the multiplexer 308. The multiplexed data is input via the buffer 310 to the write signal processing circuit 312 where signal processing, such as addition of an error correcting code, is performed on the data. The control CPU 314 controls the write head 313 such that the picture data after the signal processing is recorded on the recording medium 500 as the moving picture data for normal playback 500a.

When moving picture data received by the analog broadcasting tuner 402 is recorded, the control CPU 314 outputs the mode selecting signal to the selector 305, the audio encoder 307, and the selector 311.

The picture signal from the analog broadcasting tuner 402 is input to the video encoder 306 via the selector 305, while the audio signal is input to the audio encoder 307 via the selector 305.

The video encoder 306 encodes the received picture signal in compliance with an algorithm such as MPEG 2 and outputs the resultant data, while the audio encoder 307 encodes the input audio signal in compliance with a given algorithm and outputs the resultant data. The output data of the video encoder 306 and the output data of the audio encoder 307 are multiplexed by the multiplexer 308 and the multiplexer 308 outputs the resultant data. The output of the multiplexer 308 is input to the write signal processing circuit 312 by way of the buffer 310 and the selector 311. The control CPU 314 inputs a write control signal into the write head 313 so as to control the write head 313, whereby the output data of the multiplexer 308 is recorded on the recording medium 500 as moving picture data for high-speed playback 500b.

(Operation Performed when Moving Picture Data for Normal Playback and Moving Picture Data for High-Speed Playback are both Recorded)

Next, it will be described how recording operations are performed when a broadcast received by the digital broadcasting tuner 401 is recorded as moving picture data for normal playback 500a which is played back at normal speed, and also as moving picture data for high-speed playback 500b.

First, the control CPU 314 outputs, to the selector 305, the video encoder 306, and the audio encoder 307, a mode selecting signal indicating recording of moving picture data for high-speed playback.

In response to this, the selector 305 switches so that the output data of the resolution-lowering circuit 302 is input to the video encoder 306 and that the output data of the channel down mix 304 is input to the audio encoder 307.

The picture data received by the digital broadcasting tuner 401 is input to the video encoder 306 by way of the video decoder 301 and the resolution-lowering circuit 302.

The video encoder 306 encodes the input moving picture data in such a manner that either the upper or lower portion of the first frame (i.e., a portion having a height greater than or equal to one-half of the height of the entire frame) in the moving picture data becomes a region that is intraframe-coded (hereinafter referred to as an intraframe-coded region). The region other than the intraframe-coded region is intraframe-coded or interframe-coded. Encoding of the next frame is performed as follows. When the upper portion of the first frame is the intraframe-coded region, the next frame is encoded so that the lower portion thereof (which corresponds to the region in the first frame other than the intraframe-coded region) becomes an intraframe-coded region. On the other hand, when the lower portion of the first frame is the intraframe-coded region, the next frame is encoded so that the upper portion thereof (which corresponds to the region in the first frame other than the intraframe-coded region) becomes an intraframe-coded region. Such encoding process is repeated, whereby, in each of the frames output from the video encoder 306, either the upper or lower portion is alternately an intraframe-coded region, as shown in FIG. 3A.

The audio data is input, by way of the audio decoder 303 and the channel down mix 304, into the audio encoder 307 where the audio data is encoded in accordance with a given algorithm.

The encoded moving picture data and audio data are multiplexed by the multiplexer 308 and the resultant data is then temporarily stored in the buffer 310.

On the other hand, the output data of the digital broadcasting tuner 401, which is to be recorded as moving picture data for normal playback, is temporarily stored in the buffer 309, as in the case in which pictures received by the digital broadcasting tuner 401 are recorded as they are.

By outputting a write control signal to the selector 311 and the write head 313, the control CPU 314 controls the selector 311 and the write head 313, so that the data stored in the buffer 309 or the data stored in the buffer 310 is recorded in a corresponding region in accordance with a time at which the recording medium 500 is accessed. Specifically, the data stored in the buffer 309 is recorded in a region in which moving picture data for normal playback 500a is to be recorded, or the data stored in the buffer 310 is recorded in a region in which moving picture data for high-speed playback 500b is to be recorded.

The video encoder 306 generates two time maps based on the input moving picture data: a time map which has the same format as the time map 200c and in which time stamps that correspond to the times indicated on the respective frames displayed according to the moving picture data for normal playback 500a are associated with the storage addresses of the moving picture data for normal playback 500a on the recording medium 500; and a time map which has the same format as the time map 200d and in which time stamps in the moving picture data for high-speed playback 500b are associated with the storage addresses of the moving picture data for high-speed playback 500b on the recording medium 500. These time maps are recorded on given regions in the recording medium 500. As described above, generally, the time stamps of the moving picture data for high-speed playback 500b and the time stamps of the moving picture data for normal playback 500a uniquely correspond to each other and thus can be converted to each other. In this embodiment, the moving picture data for normal playback 500a and the moving picture data for high-speed playback 500b are recorded so as to have the same stamps for the corresponding pictures.

As described above, the moving picture data recording apparatus of this embodiment is capable of generating both the moving picture data for normal playback 500a and the moving picture data for high-speed playback 500b. In addition, particularly when the moving picture data recording apparatus is combined with the digital broadcasting tuner 401 and the analog broadcasting tuner 402, the video encoder 306, the audio encoder 307 and the like can be shared.

In this embodiment, when an analog broadcast is input, the analog data is compression-encoded to generate not only moving picture data for high-speed playback 500b, but also moving picture data for normal playback 500a. In this case, the video encoder 306, the audio encoder 307, and the multiplexer 308 operate in a time division manner.

(Moving Picture Data Recording Apparatus according to Another Embodiment)

Figure 10A:
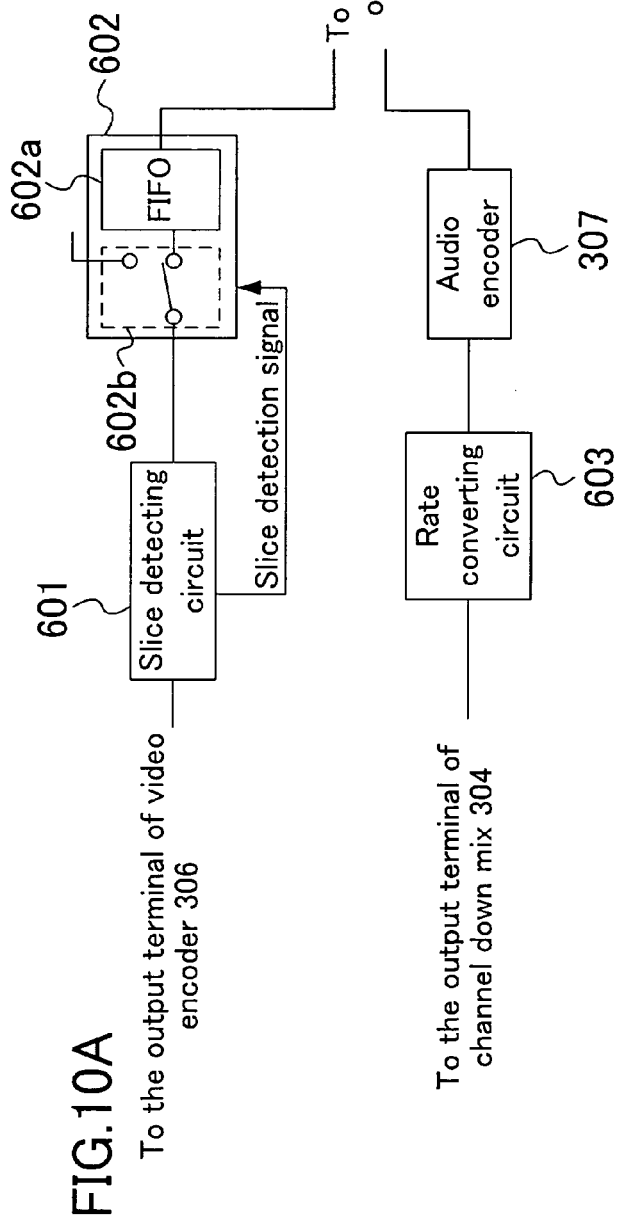
FIG. 10A is a view indicating the main portion of a moving picture data recording apparatus according to another embodiment of the present invention.

As shown in FIG. 10A, a slice detecting circuit 601 and a picture forming circuit 602 may be provided between the video encoder 306 and the multiplexer 308, and, in addition, a rate converting circuit 603 may be provided between the channel down mix 304 and the audio encoder 307.

The slice detecting circuit 601 receives moving picture data from the video encoder 306 and outputs the moving picture data as it is to the picture forming circuit 602, while the slice detecting circuit 601 detects, from the received moving picture data, a slice start code that indicates the beginning of a slice. Upon detection of the slice start code, the slice detecting circuit 601 outputs, to the picture forming circuit 602, a slice detection signal that indicates the beginning of a slice in the moving picture data.

The picture forming circuit 602 includes therein a FIFO buffer 602a and a switch 602b. In response to the slice detection signal, the picture forming circuit 602 extracts part of the moving picture data in the intraframe-coded region in each frame and outputs the extracted data by way of the FIFO buffer 602a, thereby synthesizing the intraframe-coded regions of a plurality frames. The rate converting circuit 603 receives audio data output from the channel down mix 304, and outputs the received audio data as an audio signal (a digital signal) which is to be played back at double speed.

Figure 10B:
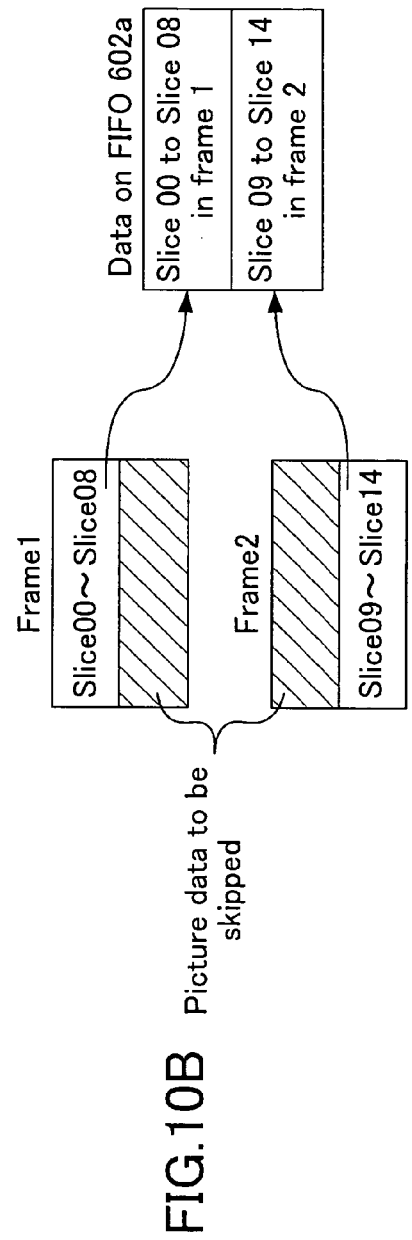

Consequently, as shown in FIG. 10B, the moving picture data on the FIFO buffer 602a has frames, in each of which two original picture frames have been combined. For example, as shown in FIG. 3C, the upper portion of each frame is an intraframe-coded region produced from an odd-numbered original picture frame and the lower portion thereof is an intraframe-coded region produced from an even-numbered original picture frame.

Therefore, if the moving picture data is played back in the same manner as in the normal-speed playback, the number of frames processed per unit time doubles as compared with the normal-speed playback, which means that the double-speed playback is achieved. If the moving picture data is played back in the same manner as in the double-speed playback performed by the moving picture data playback apparatus 100, the number of frames processed per unit time is four times greater than that in the normal-speed playback, thereby achieving the quadruple-speed playback.

The level of the resolution lowering (i.e., the resolution lowering from 1920×1088 pixels to 704×480 pixels) performed by the moving picture data recording apparatus of this embodiment is exemplary, and the moving picture data recording apparatus may be designed so as to produce moving picture data for high-speed playback having a lower resolution (e.g., 352×240 pixels).

Also, in the case of data for high-speed playback, generation of audio data may be omitted, so that the area in which the data is recorded can be reduced.

Furthermore, even if the moving picture data recording apparatus is designed so that two frames output from the resolution-lowering circuit 302 are synthesized and the synthesized data is encoded by the video encoder 306, data for high-speed playback, similar to the above-described data, can be obtained.

<Configuration of Other Moving Picture Data for High-Speed Playback>

The following moving picture data for high-speed playback may also be played back by the moving picture data playback apparatus 100 and recorded by the moving picture data recording apparatus 300.

More specifically, as shown in FIG. 3B, the regions other than the intraframe-coded regions may be formed only of pixels having a given luminance, for example. Then, the amount of moving picture data for high-speed playback can be reduced further.

Moreover, as shown in FIG. 11, moving picture data for high-speed playback generated using every other original-picture frame, for example, may be played back. In the exemplary case shown in FIG. 11, the moving picture data for high-speed playback is formed using odd-numbered original-picture frames.

If this moving picture data for high-speed playback is played back in the same manner as in the normal-speed playback, the number of frames processed per unit time doubles as compared with the normal-speed playback, which means that the double-speed playback is achieved. Also, if the moving picture data for high-speed playback is played back in the same manner as in the double-speed playback of the moving picture data playback apparatus 100, the number of frames processed per unit time is four times greater than that in the normal-speed playback, thereby achieving the quadruple-speed playback.

The amount of the moving picture data for high-speed playback thus configured can also be reduced.

Furthermore, in the encoding process, high-frequency components may be removed. In this case, it is also possible to reduce the amount of the moving picture data for high-speed playback.

The present invention is not limited to the moving picture data for high-speed playback in which, as described above, the upper or lower portion of each frame, i.e., a portion in each frame that is greater than or equal to one-half of the entire frame, is intraframe-coded. When the high-speed playback is performed at least at N-fold speed (N being an integer greater than or equal to 2), the moving picture data for high-speed playback may be configured so that in each of the frames thereof, a region having a height grater than or equal to 1/N-th of the height of the entire frame is intraframe-coded.

The present invention is not limited to the intraframe coding, but may be applicable to cases where a coding system such as intra-filed coding is employed, in which data in the regions used in the synthesis process can be decoded in a single filed.

The present invention is not limited to the case in which the moving picture data for normal playback, the moving picture data for high-speed playback, and the time maps are recorded on the same recording medium. The moving picture data for normal playback, the moving picture data for high-speed playback, and the time maps may be recorded on different recording media.

Also, by not generating audio data for high-speed playback, or by not recording data contained in a data broadcast for high-speed playback, the area in which the data used in the high-speed playback is recorded may be reduced Instead of the moving picture data for high-speed playback, moving picture data for other special playback, e.g., moving picture data taken from a different angle than moving picture data for normal playback, may be recorded on a recording medium, and then played back by the moving picture data playback apparatus 100. In this case, the special playback is performed as follows. The switching between the normal playback and the special playback is performed based on time maps. The frame synthesization by the slice detecting circuit 106 and the picture forming circuit 107 is not performed. The selector 105 is switched to the video decoder 110 position, and the moving picture data for special playback is played back in the same manner as the moving picture data for normal playback.

It is noted that the present invention is not limited to the above embodiments.

A part or all of the circuits described in the above embodiments may be replaced by software and a processor that executes the software.

Further, each signal in the above embodiments may be replaced by information on a memory or a register.

The DVD and the hard disk described as the recording media are just examples, and the present invention is not limited to the above-mentioned DVD and the like, so long as a randomly accessible recording medium having a concentric or helical track structure is employed.

As described above, the moving picture data playback apparatus, the moving picture data playback method, the moving picture data recording apparatus, the moving picture data recording method, and the recording medium having moving picture data recorded thereon according to the present invention enable smooth high-speed playback to be performed even if the playback speed is changed stepwise, and, in addition, the number of frames skipped is reduced in the high-speed playback. Therefore, the moving picture data playback apparatus, the moving picture data playback method, the moving picture data recording apparatus, the moving picture data recording method, and the recording medium of the present invention are respectively applicable to, e.g., moving picture data playback apparatus and moving picture data playback methods, in which high-speed playback and other special playback of moving pictures are performed; moving picture data recording apparatus and moving picture data recording methods for recording the moving picture data played back by the moving picture data playback apparatus; and recording media having the moving picture data recorded thereon.

What is claimed is:

1. A moving picture data playback apparatus for reading moving picture data recorded on a randomly accessible recording medium, and playing back moving pictures, the apparatus comprising:
   a first reading unit for reading first moving picture data from the randomly accessible recording medium;
   a second reading unit for reading, from the randomly accessible recording medium, second moving picture data that has a different attribute from the first moving picture data and are stored in an area of the randomly accessible recording media different from an area of the randomly accessible recording media where the first moving picture data are stored; and
   a control circuit for controlling the first reading unit and the second reading unit so that either the first moving picture data or the second moving picture data is selected and read, wherein:

the control circuit is configured to:
   when the apparatus changes playback of the first moving picture data to playback of the second moving picture data, obtain a first address of a region in the randomly accessible recording medium from which reading of the second moving picture data is started after the changeover from the playback of the first moving picture data to the playback of the second moving picture data, based on first information,
   when the apparatus changes playback of the second moving picture data to playback of the first moving picture data, obtain a second address of a region in the randomly accessible recording medium from which reading of the first moving picture data is started after the changeover from the playback of the second moving picture data to the playback of the first moving picture data, based on second information, and
   control the first reading unit or the second reading unit so that reading of the second moving picture data is started from the region located in the first address, and reading of the first moving picture data is started from the region located in the second address,
the first information is information in which time stamps that correspond to times indicated on respective pictures displayed according to the first moving picture data are associated with first starting addresses of regions in the randomly accessible recording medium, in which the first moving picture data is stored with the first starting addresses corresponding to the first moving picture data, and
the second information is information in which time stamps that correspond to times indicated on respective pictures displayed according to the second moving picture data are associated with second starting addresses of regions in the recording medium, in which the second moving picture data is stored with the second starting addresses corresponding to the second moving picture data.

2. The apparatus of claim 1, wherein:
the first read unit reads, from the randomly accessible recording medium, moving picture data for normal playback encoded so as to be played back at normal playback speed as the first moving picture data;
the second read unit reads, from the randomly accessible recording medium, moving picture data for high-speed playback that is capable of being played back at a speed higher than the normal playback speed and contains a plurality of pictures, each of which contains at least an intraframe-coded region, as; and
the apparatus further includes a high-speed-playback-picture playback unit for playing back a synthesized picture, in which intraframe-coded regions of a plurality of the pictures have been combined based on the moving picture data for high-speed playback read by the second reading unit.

\* \* \* \* \*